United States Patent [15] 3,687,298
Rozkydalek [45] Aug. 29, 1972

[54] APPARATUS FOR SEDIMENTATION OF SOLID IMPURITIES FROM LIQUIDS

[72] Inventor: Jiri Rozkydalek, Brno, Czechoslovakia

[73] Assignee: Separa Brno, inzenyrska Kancelar, Brno, Czechoslovakia

[22] Filed: May 20, 1970

[21] Appl. No.: 39,046

[30] Foreign Application Priority Data

May 22, 1969 Czechoslovakia.........3644-69

[52] U.S. Cl...................................210/519, 210/522
[51] Int. Cl. ..............................................B01d 21/10
[58] Field of Search...........210/83, 84, 519, 521, 522

[56] References Cited

UNITED STATES PATENTS 349,990   9/1886   Gaillet et al. ...............210/521

Primary Examiner—John Adee
Attorney—Richard Low and Murray Schaffer

[57] ABSTRACT

A method of multistage continuous sedimentation and separation of solids from liquids consists in guiding the main stream of contaminated liquid through a succession of stages preceding under common hydraulic pressure. In this succession liquid is caused to follow an inclined path and to pass alternately through laminar flow areas where settling of solids takes place, and through turbulent flow areas where agglomerating of finer particles, particularly under dosing of chemical coagulants, occurs. In the successive stages the upward flow rate of the liquid is progressively reduced and successively finer solids thus caused to settle therein. The progressive reducing of the liquid flow rate is achieved by regulating of withdrawal of the cleaned liquid from the single stages to a value which is equal or smaller than the minimum sedimentation rate of solids that are to be separated in the corresponding stage.

An apparatus for carrying out the multistage continuous sedimentation comprises a plurality of separate compartments having an identical cross sectional area and conforming oblique bottoms. The compartments are installed one above another in a common enclosure. The waste liquid to be cleaned is admitted to the uppermost compartment and the clarified liquid portion discharged from the top parts of the single compartments towards a common take-off level. The individual compartments are interconnected by means of overflow gaps defined by overlapping bottom sections thereof.

7 Claims, 7 Drawing Figures

INVENTOR
JIRI ROZKYDALEK
BY
ATTORNEY

INVENTOR
JIRI ROZKYDALEK
BY
ATTORNEY

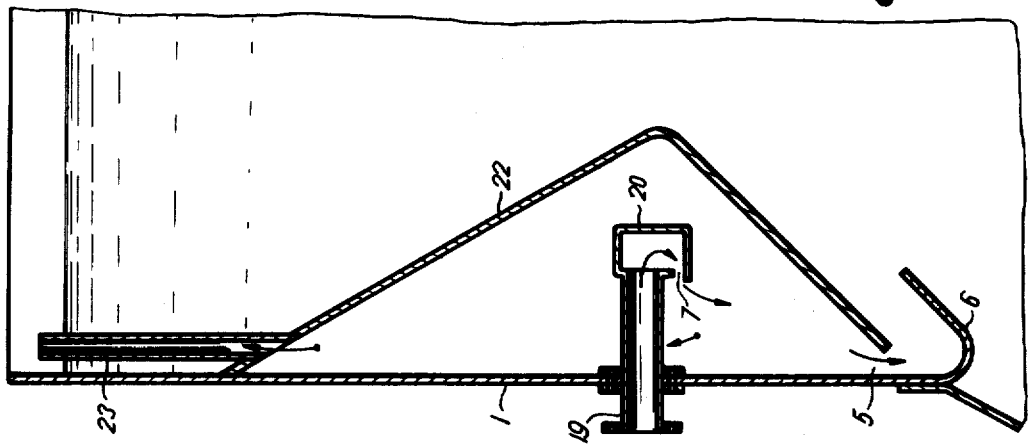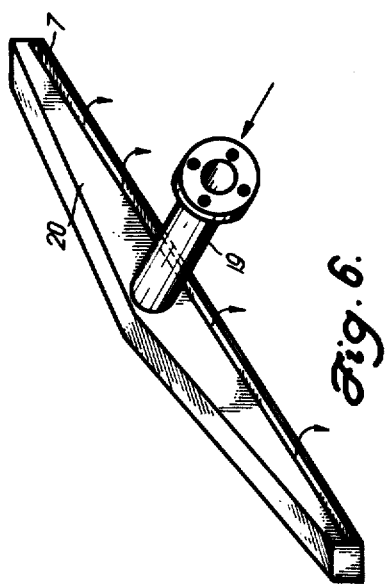

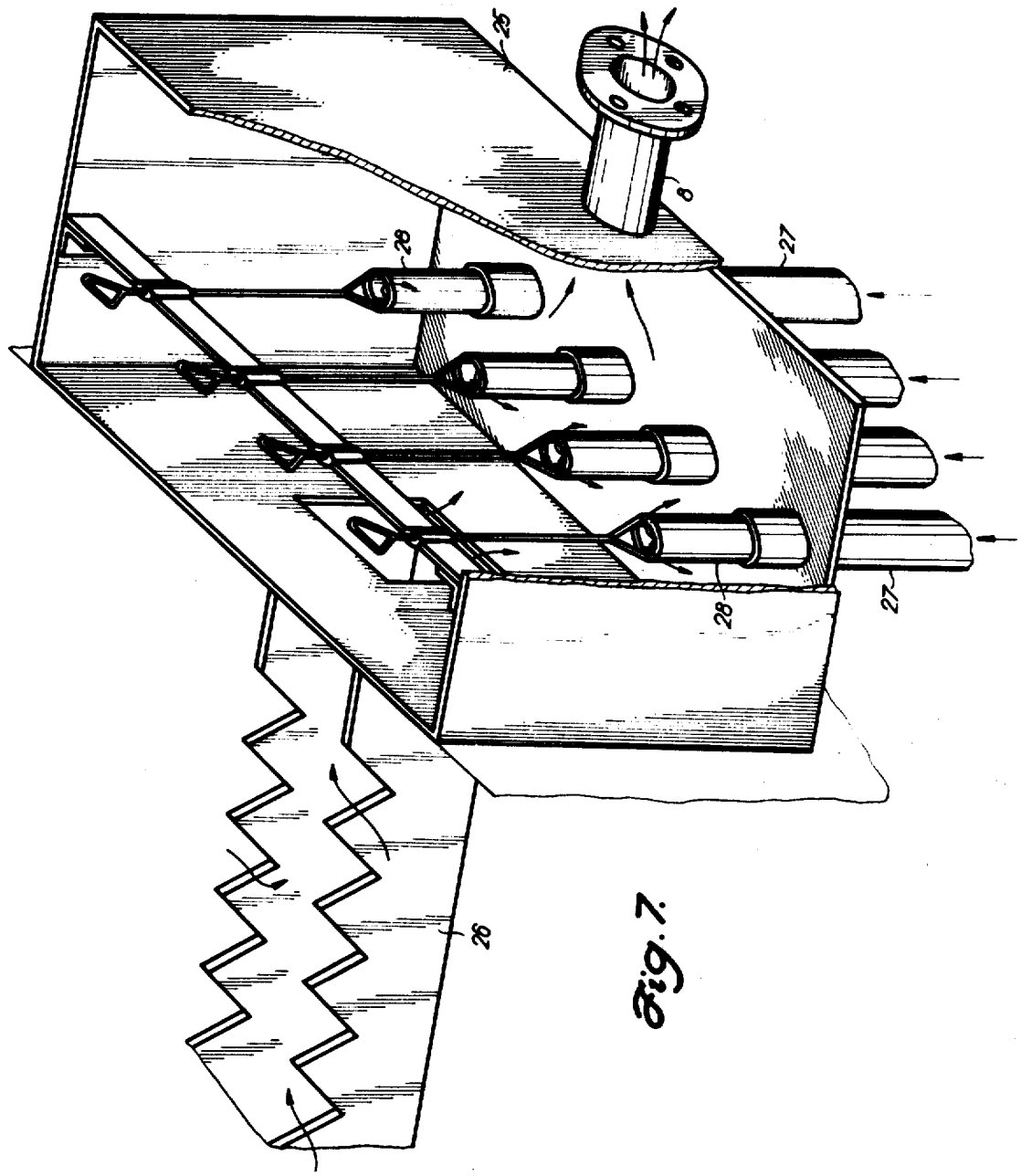

3,687,298

APPARATUS FOR SEDIMENTATION OF SOLID IMPURITIES FROM LIQUIDS

BACKGROUND OF THE INVENTION

The present invention relates to an apparatus for clarifying liquids containing suspended solids.

Methods of clarifying contaminated liquids that are based on the principle of continuous gravity separation and gravity concentration of suspended solids are generally known. In most cases, these methods are carried out as one-step operations, i.e. as simple sedimentation processes from which polydisperse sludge results. In principle, it is not decisive whether the process is carried out in an one-stage device or whether it is effected in an equipment consisting of several stages that are parallelly fed and parallelly discharged.

The main disadvantage of the afore-mentioned conventional methods of simple sedimentation, as applied in industrial sewage treatment plants, is that the cleaned liquid is retained for a relatively long time in these plants. It is due to the fact that the effective through-put thereof and the retention time of the treated liquid therein depend on the polydispersion of the suspended solid phase, i.e. on the sorts, dimensions and specific weights of the solid particles. It holds here that the maximum through-put rate of the treated liquid in such a commonly used device is limited by the lowest sedimentation rate of particles that are to be separated therein. Besides, requirements on the quality of the resulting product, whether it is the clarified liquid or the concentrated sludge, can affect the actual through-put of the device, of course.

It is further generally known that by long retaining the cleaned liquid within the equipment the rate and the efficiency of the sedimentation can be reaffected in an unfavorable way. It is especially for the impurities of organic origine which decompose due to ageing or substantially change their characteristic properties. In the same way also the filtering and sludge dewatering process becomes difficult and lengthy because of the decomposition and altering of the sludge particles, as well. Moreover, there is given no possibilty of successive sorting and grouping of polydisperse solids in the conventional one-step sedimentation methods and apparatuses. And sometimes, the selective grouping of polydisperse sludge can be very important from the economical point of view. Some of the particle groups may be recycled back into the manufacturing process and the other utilized in another way or treated separately, in a much easier manner.

Referring now to the equipment commonly used for effecting the continuous one-step sedimentation processes, we can only repeat what was said above on account of the clarifying methods. As the retention time of the treated liquid in the conventional apparatuses is considerably long, they must be built up with an adequately large volume and, above all, with a sufficiently large horizontal flow section.

For the sake of saving the built-up surface, such apparatuses are designed in a multistage form, with several sedimentation tanks installed one above another. All the tanks are, however, operated simultaneously, indepedently and on the principle of simple sedimentation. All of them are fed with the waste liquid of the same quality and at the same volume rate. In a similar way even the clarified liquid is discharged parallel from the upper take-off levels of the liquid bodies in the individual tanks, while the sludge portions from the bottom parts thereof.

It stands to reason that even manufacture and assembly of the afore-mentioned bulky and voluminous devices are very expensive and demand special material and special manufacturing and assembling mechanisms. The same holds good even for the transport of these devices from the place of manufacture to the place of installation. Moreover, special treating of the overall area and reinforcing of the supporting surface are necessary because of the high weigth of the device.

SUMMARY OF THE INVENTION

It is accordingly the primary object of the invention to provide an efficient and economical method of continuously clarifying liquids containing suspended solid particles under a high rate of sedimentation of impurities and in the smallest volume of equipment which is possible.

Another object of the invention is to provide a method of continuous multistage sedimentation resulting in successive sorting and selective grouping of the polydisperse solid phase.

An important object of the invention is to provide further a method of continuous multistage sedimentation which can take full advantage of favorable hydrodynamic features of the waste liquid that is caused to follow an alternately descending and ascending inclined path and to pass through a set of successive stages in which laminar flow zones and turbulent flow zones alternately.

The invention aims further at an apparatus for continuously clarifying liquids in which liquid to be cleaned is caused to move on an inclined path and to pass through a succession of compartments having an identical cross sectional area and being mounted one above another in a common enclosure. All the compartments of the referred-to apparatus are operated under a common hydraulic pressure and under the flow rate of the contaminated liquid progressively decreasing from one compartment to the next compartment below so that still finer solids may settle therein and be drained off therefrom. With the decreasing flow rate of the treated liquid, the through-put of the individual compartments decreases simultaneously so that the actual resulting through-put of the whole assembly can exceed the maximal through-put of those multistage apparatuses that are adapted for simple sedimentation and in which a set of sedimentation stages is operated parallelly.

A very important object of this invention is that the referred-to apparatus demandes neither large overall area nor special treating and stiffening of the area to be built up. No expensive manufacturing means and instal- lating equipment are further necessary. The apparatus according to the invention is designed to be easily assembled inside the producing plant as well as to be easily transported therefrom to the place of installation.

BRIEF DESCRIPTION OF ACCOMPANYING DRAWINGS

Other features and many attendant advantages of the invention will readily be appreciated as the same becomes better understood by reference to the following detailed description of one of the preferred embodiments, when considered in connection with the accompanying drawings, in which:

FIG. 5 is a fragmentary vertical section of still further part of the apparatus according to FIG. 1 and shows, on an enlarged scale, inlet means and distributing means for supplying and distributing the contaminated liquid into the first compartment, as well as an inlet chamber communicating with these inlet means and distributing means;

FIG. 6 is a side view showing the inlet means and the distributing means according to FIG. 5 in greater detail; and FIG. 7 is a fragmentary perspective view of an apparatus similar to that according to FIG. 1 and shows, on an enlarged scale, another modification of the outlet means for discharging the clarified liquid therefrom and for adjusting the draw-off rate of the liquid.

DETAILED DESCRIPTION OF THE PREFERRED EMBODIMENT

Figure 1:
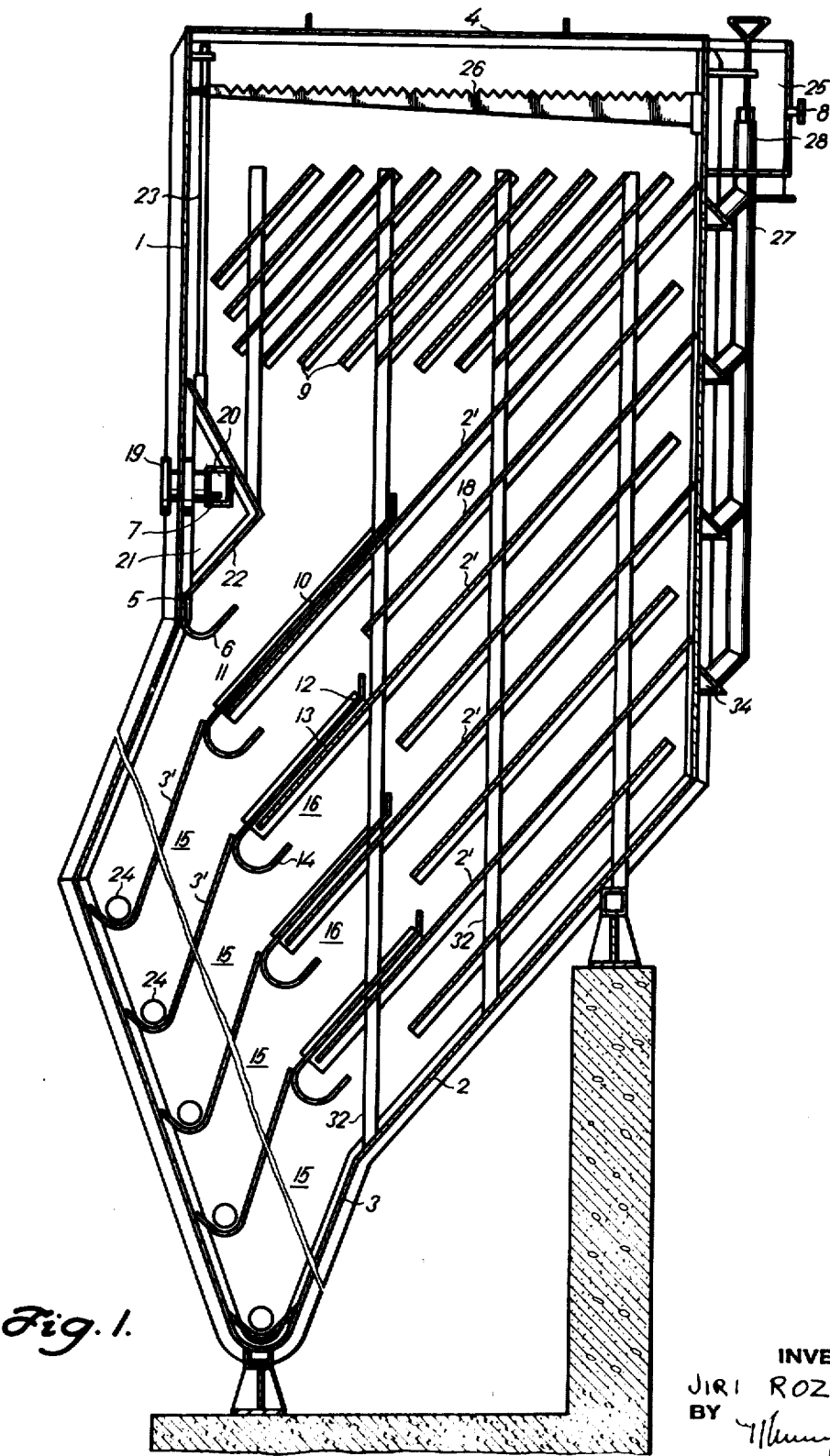
FIG. 1 is a vertical sectional view of an apparatus adapted for five-stage continuous sedimentation of contaminated liquids, said apparatus comprising five separate compartments installed one above another in a common enclosure.

Referring now to the drawing in detail, initially to FIG. 1, an apparatus for continuously clarifying contaminated liquids has an upright annular shell 1 provided with a flat cover 4 and an oblique external bottom. The bottom consists of two sections forming an obtuse angle: an upper section 2 and a lower section 3.

The internal space of the apparatus is divided into five compartments I to V having an identical cross sectional area and being situated one above another. The single compartments are bounded by means of a set of internal bottoms that are parallel to the external bottom and conforming therewith. Similarly like the external bottom, these internal bottoms consist of two sections 2' and 3', too. The upper and lower sections of the internal bottoms do not meet each other, however. The length and heigth ratio of the compartments II to V is preferably greater than 3:1.

Above the upper section 2' baffles 10 are arranged in an uniform distance from the top surface of the sections. Thus, the baffles 10 overlap the lower portions of the bottom sections 2' in a vertically spaced manner and meet the bottom sections 3' to form the same angle as the sections 2 and 3 of the external bottom do.

Between the overlapping portions of the baffles 10 and the bottom sections 2 an elongated overflow gap 11 is left, these gap interconnecting the internal spaces of two adjacent compartments.

The upper edges of the baffles 10 are deflected upwardly so as to form funnel-like inlet mouths 12 of the gaps. The maximum cross sectional area of the funnel-like mouth 12 do not exceed, anyway, 60 percent of the entire cross sectional area of the compartments II to V, respectively.

To the opposite, lower ends of the baffles 10 semicircular deflector means 14 are attached, these deflector means projecting downwardly from the lines in which the baffles 10 are linked up with the bottom sections 3'.

In each of the compartments I to V three functional areas take place. They are: the sludge sumps 15, the settling areas 16 and the clarifying areas 17. In the lowermost parts of the sludge sumps 15 means 24 for removing the concentrated sludge are arranged. They may be screw conveyors mechanical scrapers, wiper means, delivery rakes etc.

In the uppermost parts of the clarifying areas 17 of the compartments II to V overfalls 34 are provided, on the other hand. These overfalls communicate with the internal space of the compartments II to V by means of a longitudinal row of discharge orifices made in the shell 1. In the overfalls draw-off tubes 27 terminate, these tubes leading upwardly towards an adjusting receiver 25 in which a common liquid level flush with the level of the body of the liquid in the top compartment is created.

Beside the draw-off tubes 27 an overflow channel 26 mouths into the adjusting receiver 25, this channel overbridging nearly the entire inner cross section of the uppermost compartment. By means of the overflow channel 26 clarified liquid portions from the top of this compartment are discharged.

On the upper ends of the draw-off tubes 27 adjustable flow regulators 28 are provided. It may be, for example, elastic bellows like illustrated in FIG. 1 or sets of telescopical tube couples like illustrated in FIG. 7. In the side wall of the receiver 25 that is opposite to the mouthing of the overflow channel 26 an outlet socket 8 is further provided.

In the clarifying areas of the compartments II to V additional partition walls may preferably be built in, these partition walls 18 dividing the clarifying areas into two narrower channels, thus shortening the necessary path of the sinking particles. In a similar way, the inner space of the uppermost compartment I can be divided into a plurality of calming channels by means of a set of parallel partitions 9.

The waste water or contaminated liquid is supplied to the uppermost compartment I. It enters the same through an inlet socket 19 mouthing into a longitudinal tubular distributor 20. The distributor 20 is installed in a deaerating chamber 21 that is bounded by a profiled shield 22 and the side wall of the apparatus. It extends essentially along the entire length of this wall. In the lower portion of the side wall of the distributor 20 which faces the inner wall of the apparatus longitudinal outlet gap 7 is provided. The shield 22 is attached by its upper edge portion to the wall of the apparatus, while between the lower edge thereof and the inner wall of the apparatus an overflow gap 5 is left, this gap facing a semicircular deflector means 6.

From the upper part of the deaerating chamber 21 a deaerating tube 23 is led as far as to the atmosphere above the liquid level in the uppermost compartment.

The layout both of the deaerating and liquid distributing means according to FIG. 1 is illustrated in greater detail and in a more saying way in FIGS. 5 and 6.

Figure 2:
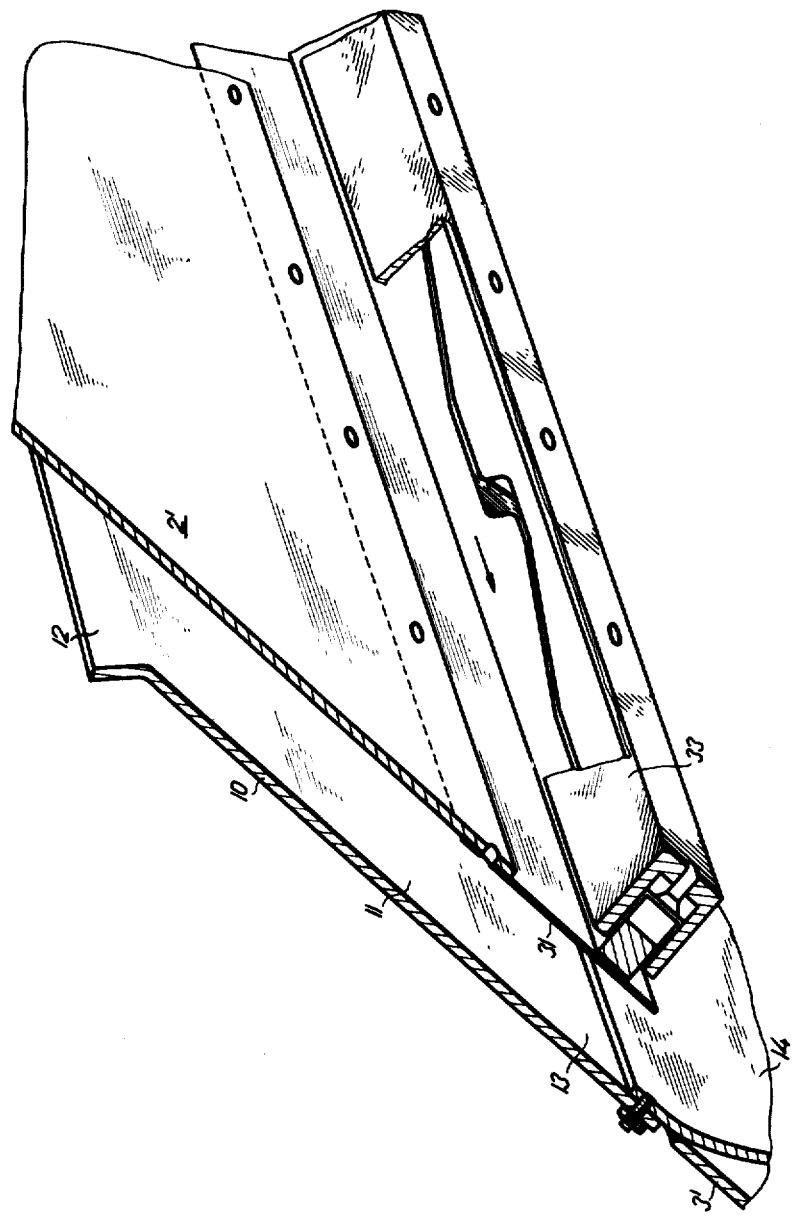
FIG. 2 is a fragmentary perspective view of the apparatus according to FIG. 1 and shows, on an enlarged scale, an overflow gap interconnecting two adjacent compartments, as well as means for adjusting the width of said gap.

In FIG. 2 means are illustrated that make the outlet mouth 13 of the overflow gaps 11 adjustable. These means consist of flexible metal sheet 31 fixed to the bottom section 2' in such a manner that it replaces the lower border thereof, and a set of sliding wedges 32 engaging the underside of the flexible metal sheet 31. When there is a necessity to make the outlet mouth 13 of the gap 11 narrower, the wedge that is nearer to the metal sheet 31 may be caused to slide along the other wedge so as to deflect the metal sheet against the baffle 10.

Figure 3:
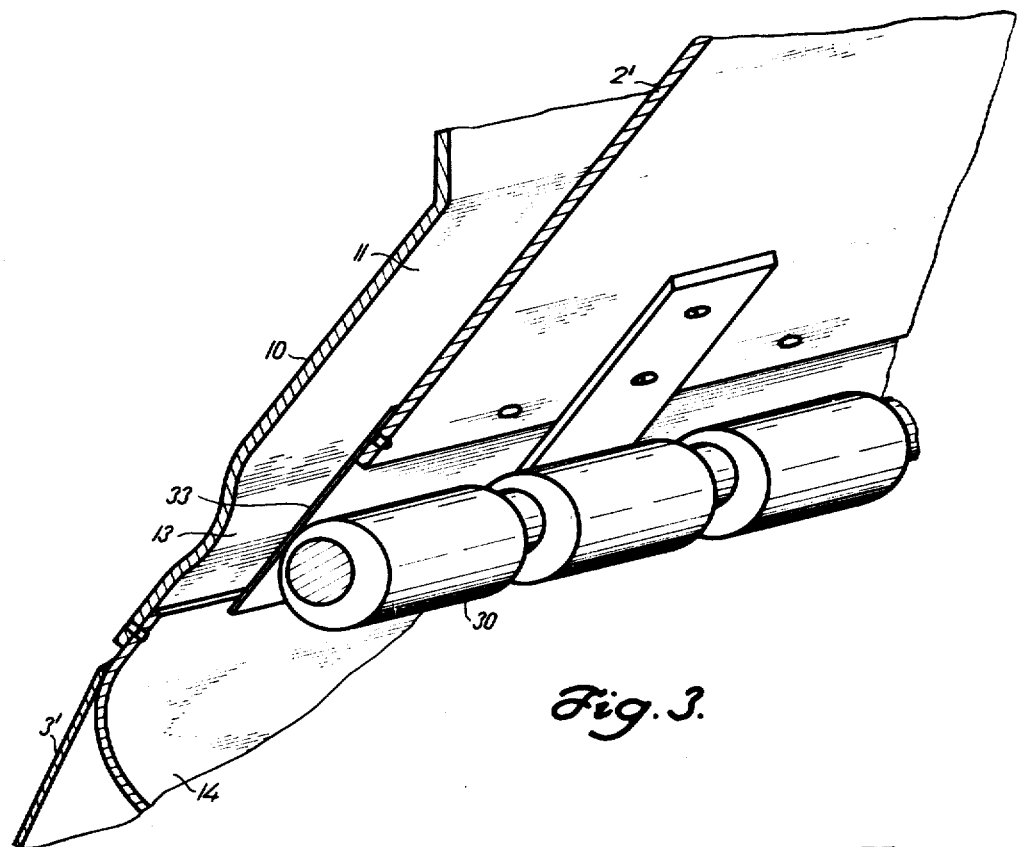
FIG. 3 is a similar perspective view of another modification of means serving for adjusting the width of the overflow gap.

FIG. 3 shows another embodiment of the means for adjusting the outlet mouth 13 of the overflow gap 11. A set of eccentric disks 30 engage the underside of the metal sheet according to this embodiment. By successive turning of the eccentric disks 30 the outlet mouth 13 may be narrowed less or more so as to form a nozzle.

Figure 4:
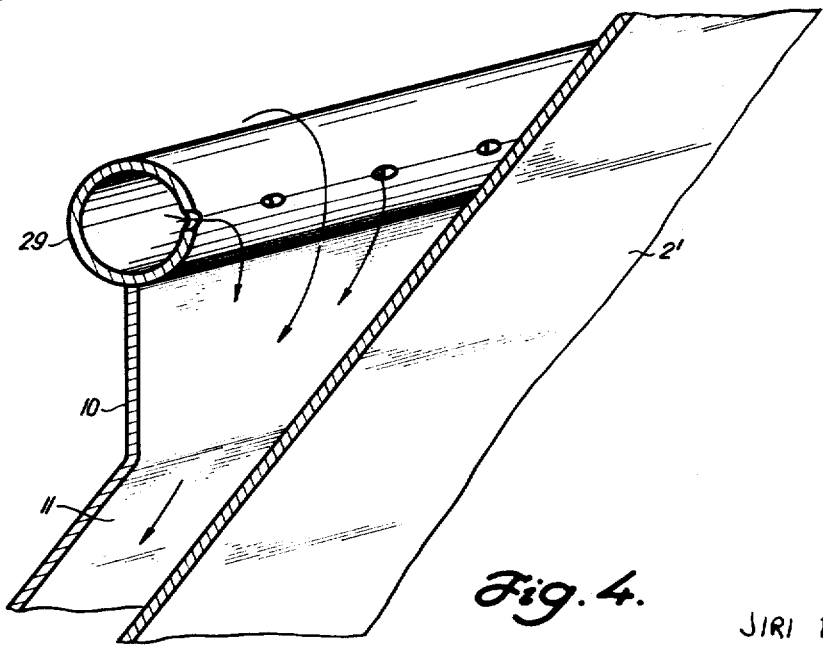
FIG. 4 is a fragmentary perspective view of another part of the apparatus according to FIG. 1 and shows, on an enlarged scale, tubular means for supplying chemical coagulants into the inlet mouth of the overflow gap.

In FIG. 4 a manifold tube 29 for supply of chemical coagulants to the contaminated liquid is represented. In the embodiment of FIG. 4 the manifold tube 29 is preferably fixed to the upper edge of the baffle 10 and is provided with a single row of distributing orifices facing the upper surface of the bottom section 2'.

The apparatus as described above with reference to the drawing is operated as follows:

The raw water or the contaminated liquid is admitted through the inlet socket 19 to the longitudinal tubular distributor 20. From there it passes through the longitudinal gap 7 into the deaerating chamber 21. In this chamber air portions absorbed in the contaminated liquid or entrained therewith may deliver due to the drop of the flow rate of the liquid. The released air portions discharge through the deaerating tube 23 towards the atmosphere above the liquid level in the top compartment.

From the deaerating chamber the calmed liquid flows uniformly through the overflow gap 5 into the settling area 16 of the uppermost compartment, where sedimentation of particles the sedimentation rate of which is higher than the upward flow rate of the treated liquid takes place. The concentrated sludge, collected on the bottom section 2', sinks by gravity towards the sludge sump 15.

In the settling area and particularly in the level of the inlet mouth 12 of the overflow gap 11 division of the main liquid stream is effected. The primary, main stream of the partially cleaned liquid is diverted through the overflow gap 11 into the next compartment below. Together with this primary liquid stream particles of lower sedimentation rate are carried to further sorting.

The remaining, secondary liquid stream rises with a reduced velocity towards the clarifying area 17 where additional sedimentation takes place. The cleaned liquid is drained off from the top part of the uppermost compartment by means of the overflow channel 26. By this channel the adjusting receiver 25 is fed and a common liquid level formed therein. From the receiver the cleaned liquid is discharged continuously by means of the outlet socket 8.

Similar clarifying process is effected even in the second compartment:

the main liquid stream getting out from the outlet mouth 13 of the overflow gap 11 is deflected upwardly by means of semicircular deflector 14 and ascends at a progressively reduced velocity towards the overfall 34 atop of the compartment. Particles the sedimentation rate of which is higher that the upward flow rate of the liquid sink down to the bottom, while the clarified, secondary liquid stream goes on in rising upwardly.

The same is true even for the following compartments. The main stream of the treated liquid is caused to pass with a stepwise decreasing velocity therethrough and successively finer solids thus caused to settle therein.

As a matter of fact, there are exerted two ways for successive reducing the upward flow rate of the liquid in the succession of the compartments, one of them being realized by means of regulating the withdrawal of the clarified liquid from the top parts of the compartments II to V, and the other by regulating the amount of the precleaned liquid diverted into the next compartment below. For the first effect regulators 28 are used. By means of raising or lowering the upper edge of these regulators differences between the level of the liquid body in the uppermost compartment and those of the corresponding compartments, and thus also the upward flow rate of the liquid in these compartments may be controlled.

Referring now to the upward flow rates of the liquid in the individual compartments, they are kept on about the same value during the course of the clarifying process, this value being choosen with regard to the content, sort and composition of suspended impurities and to the degree of purity required in the outgoing liquid. Besides, they depend also on the fact whether the clarified liquid or the concentrated sludge are regarded as the main, resulting product, of course.

For the sake of determinating the necessary value of the upward flow of the liquid in the individual stages, and for the sake of adjusting correctly both the take-off liquid levels and the cross sectional areas of the overflow gaps in these stages, a lot of laboratory tests must be made at the beginning of the clarifying process.

Sludge fractions that are deposited in the individual stages are discharged from the lowest places of the sludge sumps 15 and are delivered for further processing according to their nature and purpose of the clarifying process. For removing of the concentrated sludge either common means can be utilized, when there is no need to keep the sorted sludge components separate, or it is effected in parallel, by separate and independent means.

Beside the afore-described main liquid streaming an additional liquid circulation takes place both in the settling and clarifying areas of each of the compartments, this additional liquid circulation affecting in a favorable manner the sedimentation process, as well. It results from the spontaneous sinking of the deposited sludge towards the lowest places of the sludge sumps. By the sludge moving downwardly clarified liquid is forced to flow upwardly. Under the effect of the additional liquid circulation finer particles may agglomerate and be separated. On the rise of the additional liquid circulation the arrangement of the longitudinal overflow gaps 11 and the funnel-like shaping of their inlet mouths take also considerable parts.

From what has been said above the importance of the inclined shaping of the bottom sections 2, 2' and 3, 3' can readily be understood. The optimal angle the bottom sections 2 or 2' form with the horizontal plane lies within the range from 30° to 7°. For the angle formed by the horizontal plane and the bottom sections 3 or 3' adequately lower range holds.

The oblique profile of the bottom of the apparatus is, moreover, of considerable importance even from the assembling, transporting and installing point of view.

But there is still another phenomenon that is of great importance for the favorable and efficient run of the sedimentation process. It is the fact that in the settling and clarifying areas mostly laminar flow, while in the overflow gaps turbulent flow take place. The turbulent movement of the contaminated liquid contribute to more intimate contact of solids and thus also to their unifying into agglomerates of higher sedimentation rate. The character and intensity of the turbulent flow may be affected by means of adjusting the cross sectional area of the gap and particularly by nozzle-like narrowing the outlet mouth thereof.

Further increase in the total efficiency of the continuous separation of suspended solids and an increase in the throughput rate of the liquid in the present apparatus may be achieved by changing the electrokinetic potential of sludge particles by dosing the liquid being clarified with chemical coagulants or flocculants.

By this step, the surface interaction of particles and their unifying into agglomerates are promoted and become more brisky. To the agglomerates smaller particles of low sedimentation rate and very small particles which undergo Brownian movement and do not sediment at all may adhere and be caught thereby. In this way even the sludge concentration and its filterability become better. The coagulants may preferably be dosed into the area of the turbulent flow, particularly into the inlet mouth of the overflow gap because of their better distributing into the liquid and, together with this latter, over the entire settling area so as to form a floccule cloud there. By this floccule cloud extending over whole settling area and falling slowly down therethrough smaller particles can be caught. A rule may be given that the length of the overflow gap should approximately equal to the necessary heigth of the floccule cloud in the compartment into which the gap mouths.

The continuous method of clarifying liquids carrying suspended solids by means of multistage sedimentation and concentration of the solid phase may be utilized in chemical and food works, for cleaning of industrial or domestic sewage water or for sludge treatment plants, and preferably everywhere where polydisperse solid phase is to be separated from the liquid and assorted into the predeterminated groups.

Among other, the following application fields should further be stressed:

The referred-to method and apparatus may be utilized for sorting of kaolin and China clay, for granding of gravel and crushed stone from dust in stone pits or for concentration of sludge from wet gas separators in fire-brick plants as well as for separation of schistous from this sludge.

In the paper manufacture, the present invention may be applied for separation of so called "live pulp" from slime and filling agents, thus enabling the pulp to be recycled back into the manufacturing process. Further distillery plants, sugar industry and metallurgical industry are to be mentioned.

One of the main advantages of the present methods is the rapidity of sedimentation of impurities in the smallest volume of equipment which is possible. Due to this facts, the afore-described apparatus may be installed even in older plants where a lack of overall area exists, as well as in the open air where the conventional, commonly used apparatuses cannot be utilized without danger of their getting frozen.

Beside the preferred embodiments, as shown in the accompanying drawing, a lot of further modifications can be derived within the scope of the present invention. There is given, for example, an opportunity to couple two devices similar to that according to FIG. 1 by their longer upright walls to form a double-capacity unit. Material savings which result from this assembly are apparent.

We claim:

1. An apparatus for multistage continuous sedimentation and separation of solids from liquids, comprising in combination:
   A. an upright outer shell having a rectangular cross section, said shell bounding a hollow internal space;
   B. a cover removably closing said hollow internal space from the upper side;
   C. an oblique bottom closing said internal space on the opposite lower side, said bottom consisting of two sections, an upper section and a lower section, said sections meeting in a straight line with each other to form an obtuse angle the upper section of which is larger than the lower section;
   D. a plurality of inner bottoms substantially parallel to said outer bottom and conforming therewith,
      a. said inner bottoms dividing the internal space into a succession of separate compartments installed one above another, and
      b. each of said inner bottoms consisting, similarly like that outer bottom, of two sections, an upper section and a lower section,
   E. a plurality of baffles parallel to said upper section of the inner bottoms,
      a. said baffles overlapping, respectively, the lower portions of said upper sections in a vertically spaced manner so as to leave longitudinal gaps for interconnecting the adjacent compartments therebetween, each of said gaps having an inlet mouth and an outlet mouth;
   F. means for supplying the uppermost compartment with the contaminated liquid to be treated in the apparatus, said means consisting of
      a. a longitudinal tubular distributing means, said distributing means extending horizontally along the longest wall of the upright outer shell and being provided with at least one inlet socket for admitting the contaminated liquid thereto,
      b. a profiled shield surrounding said distributing means,
         1. said shield having its upper edge fixed to said longest wall, while the lower edge thereof being spaced apart from said wall so as to leave a longitudinal overflow gap therebetween, 2. said shield and said longest wall bounding a liquid deflecting and gas releasing chamber round said distributing means;

G. means for collecting and discharging the clarified liquid from the individual compartments, said means consisting of
  a. a horizontal overflow channel for withdrawal of clarified liquid from the uppermost compartment, said overflow channel extending transversely over the top part of said uppermost compartment,
  b. a plurality of elongated overfall means for withdrawal of clarified liquid from the next compartments, said overfall means being arranged in the uppermost parts of said next compartments, respectively,
  c. a plurality of draw-off tubes for discharging the clarified liquid from said overfall means,
  d. a collecting receiver adjacent to the top part of the uppermost compartment, in which receiver both the overflow channel and the draw-off tubes terminate, said receiver being further provided with an outlet socket;

H. means for discharging the concentrated sludge from the lowermost part of each of the compartments.

2. An apparatus as set forth in claim 1, wherein the upper portions of the baffles are deflected upwardly to form a funnel-like inlet mouth of the respective overflow gap.

3. An apparatus as set forth in claim 1, wherein deflector means project downwardly from the lines in which the baffles meet with the lower sections of said inner bottoms, and project downwardly from the fictive line on said longest wall that faces the free lower edge of the shield, said deflector means being bent upwardly round the adjoining overflow gaps.

4. An apparatus as set forth in claim 1, wherein elongated tubular means for supplying and distributing of chemical coagulants are arranged in the funnel-like mouth of at least one of the overflow gaps.

5. An apparatus as set forth in claim 1, wherein the outlet mouths of the overflow gaps are made adjustable.

6. An apparatus as set forth in claim 1 wherein regulating means are provided, respectively, on upper borders of the draw-off tubes inside the collecting receiver, said regulating means providing for the adjusting of the peripheral overfall upper edges of said draw-off tubes.

7. An apparatus as set forth in claim 1, wherein the internal spaces of the individual compartments are divided into three functional areas, in sludge sumps bounded by the lower bottom sections, settling areas bounded by the overfall gaps and clarifying areas bounded by the upper bottom sections, and wherein said clarifying areas are divided, respectively, by means of at least one partition wall parallel to said upper bottom sections into several narrow settling chambers.

* * * * *